(12) United States Patent
Yoshioka et al.

(10) Patent No.: US 10,543,792 B2
(45) Date of Patent: Jan. 28, 2020

(54) IN-VEHICLE HOLDER

(71) Applicant: Mitsubishi Logisnext Co., Ltd., Kyoto (JP)

(72) Inventors: Masahiro Yoshioka, Kyoto (JP); Makoto Torikawa, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 0 days.

(21) Appl. No.: 16/274,390

(22) Filed: Feb. 13, 2019

(65) Prior Publication Data
US 2019/0299876 A1 Oct. 3, 2019

(30) Foreign Application Priority Data

Mar. 27, 2018 (JP) .................. 2018-059548

(51) Int. Cl.
*B60R 11/02* (2006.01)
*B60R 7/06* (2006.01)
*B60R 16/03* (2006.01)
*B60R 7/08* (2006.01)
*B60R 11/00* (2006.01)
*B60N 3/10* (2006.01)

(52) U.S. Cl.
CPC ............ *B60R 11/0241* (2013.01); *B60R 7/06* (2013.01); *B60R 7/08* (2013.01); *B60R 16/03* (2013.01); *B60N 3/107* (2013.01); *B60R 2011/0005* (2013.01); *B60R 2011/0075* (2013.01)

(58) Field of Classification Search
CPC ......... B60R 11/0241; B60R 7/06; B60R 7/08; B60R 2011/0005; B60R 2011/0075; B60N 3/107

USPC ....... D12/422, 425, 419; 248/311.2; 224/483
See application file for complete search history.

(56) References Cited

U.S. PATENT DOCUMENTS

| D248,294 | S | * | 6/1978 | McCutchen | ................. D12/419 |
| D327,364 | S | * | 6/1992 | Mankey | ..................... D12/419 |
| D353,082 | S | * | 12/1994 | Keven | .......................... D12/420 |
| 5,628,441 | A | * | 5/1997 | Dykstra | ................. B60N 3/101 |
| | | | | | 224/483 |

(Continued)

FOREIGN PATENT DOCUMENTS

| DE | 102005025530 B3 | * | 10/2006 | ......... B60R 11/0241 |
| GB | 2528837 A | * | 2/2016 | ......... B60R 11/0241 |

(Continued)

*Primary Examiner* — Justin M Larson
(74) *Attorney, Agent, or Firm* — Kirschstein, Israel, Schiffmiller & Pieroni, P.C.

(57) ABSTRACT

An in-vehicle holder accommodates a mobile electronic device, along with a beverage cup. The device is readily viewed by a driver during charging. The holder includes first and second bottom plates, first and second sidewalls extending upward from edges of the bottom plates, and a device port on the second sidewall. The second plate is lower than, and connected to, the first plate via a stepped portion extending in a front/rear direction, and has a left edge connected to the stepped portion, an opposite right edge, a front-side edge, and an opposite back-side edge. The right edge and the front-side edge intersect in a corner raised by an elevated portion by the same amount as a level difference provided by the stepped portion. The second sidewall has a part slanting toward a back side with increasing height and is provided with the port.

4 Claims, 8 Drawing Sheets

(56) References Cited

U.S. PATENT DOCUMENTS

| | | | |
|---|---|---|---|
| D388,050 S * | 12/1997 | Diem | D12/415 |
| 6,042,414 A * | 3/2000 | Kunert | H01R 13/6272 |
| | | | 248/310 |
| D430,090 S * | 8/2000 | Walterscheid | D12/195 |
| D447,024 S * | 8/2001 | Thomas | D12/419 |
| D595,287 S * | 6/2009 | Nazar | D14/251 |
| 7,868,585 B2 * | 1/2011 | Sarnowsky | H02J 7/0042 |
| | | | 320/108 |
| 8,240,631 B2 * | 8/2012 | Schrock | B60N 3/101 |
| | | | 215/393 |
| D715,284 S * | 10/2014 | Iwamoto | D12/415 |
| 9,016,752 B2 * | 4/2015 | Myers | B60R 7/06 |
| | | | 296/24.34 |
| 9,272,670 B2 * | 3/2016 | Ito | B60R 11/0205 |
| 9,277,307 B2 * | 3/2016 | Conrad | H04R 1/028 |
| 9,387,808 B2 * | 7/2016 | Kearney | B60R 7/04 |
| 9,722,456 B2 * | 8/2017 | Lambert | B60R 16/02 |
| 10,155,482 B2 * | 12/2018 | Corso | H02J 7/0044 |
| 10,173,599 B2 * | 1/2019 | Gaw, Jr. | B60R 11/02 |
| 10,212,264 B2 * | 2/2019 | Robillard | B60R 11/02 |
| 10,404,085 B2 * | 9/2019 | An | H02J 7/0045 |
| 2011/0156418 A1 * | 6/2011 | Thorsell | B60R 7/04 |
| | | | 296/24.34 |
| 2019/0299876 A1 * | 10/2019 | Yoshioka | B60R 7/06 |
| 2019/0315287 A1 * | 10/2019 | Bober | B60N 3/10 |

FOREIGN PATENT DOCUMENTS

| | | | |
|---|---|---|---|
| JP | 2009-119960 | 6/2009 | |
| WO | WO-2009027608 A1 * | 3/2009 | B60N 3/107 |
| WO | WO-2016022840 A1 * | 2/2016 | B60R 11/0241 |
| WO | WO-2019145143 A1 * | 8/2019 | B60R 7/04 |

\* cited by examiner

IN-VEHICLE HOLDER

TECHNICAL FIELD

The present invention relates to in-vehicle holders installed within reach of drivers' seats, particularly to an in-vehicle holder suitable for accommodating both a mobile electronic device, such as a smartphone, and a beverage cup.

BACKGROUND ART

A known conventional in-vehicle holder that can accommodate a mobile electronic device and a beverage cup is described in, for example, Patent Document 1. This in-vehicle holder is installed in a center console situated between a driver's seat and a passenger seat in a vehicle, and includes a cup holder 17 for accommodating a beverage cup and a charge box 22 for accommodating a mobile electronic device. Moreover, the in-vehicle holder further includes an outlet portion 65 built in the charge box 22, with the result that the mobile electronic device accommodated in the charge box 22 can be charged.

PRIOR ART DOCUMENT

Patent Document

Patent Document 1: Japanese Laid-Open Patent Publication No. 2009-119960

DISCLOSURE OF THE INVENTION

Problems to be Solved by the Invention

However, the conventional in-vehicle holder has a problem in that when the mobile electronic device being charged in the charge box 22 displays a message or suchlike, the driver seated in the driver's seat cannot view the message or suchlike immediately.

The present invention has been achieved under the above circumstances, with a problem thereof being to provide an in-vehicle holder capable of accommodating a mobile electronic device, along with a beverage cup, such that the mobile electronic device is positioned so as to be readily viewed by a driver while being charged.

Solutions to the Problems

To solve the problem, the present invention provides an in-vehicle holder installed within reach of a driver's seat in a vehicle, including a bottom plate, a sidewall extending upward from an edge of the bottom plate, and a mobile-electronic-device connection port provided on the sidewall, wherein the bottom plate includes a first bottom plate and a second bottom plate positioned lower than the first bottom plate and connected to the first bottom plate via a stepped portion extending in a front/rear direction, the second bottom plate has a left edge connected to the stepped portion, a right edge opposite to the left edge, a front-side edge situated on a front side when viewed from the driver's seat after installation, and a back-side edge opposite to the front-side edge, the right edge and the front-side edge intersecting in a corner raised by an elevated portion by the same amount as a level difference provided by the stepped portion, and the back-side edge of the second bottom plate is connected to a part of the sidewall, the part slanting toward a back side with increasing height and being provided with the mobile-electronic-device connection port.

Preferably, the first bottom plate of the in-vehicle holder includes a circular portion corresponding to a bottom of a beverage cup.

Also preferably, the stepped portion and the elevated portion of the in-vehicle holder are 3 to 5 cm apart in a left/right direction.

Also, the mobile-electronic-device connection port of the in-vehicle holder is, for example, a USB port with an openable cap.

Effect of the Invention

The present invention renders it possible to provide an in-vehicle holder capable of accommodating a mobile electronic device, along with a beverage cup, such that the mobile electronic device is positioned so as to be readily viewed by a driver while being charged.

MODE FOR CARRYING OUT THE INVENTION

Hereinafter, an embodiment of an in-vehicle holder according to the present invention will be described with reference to the accompanying drawings.

Figure 1:
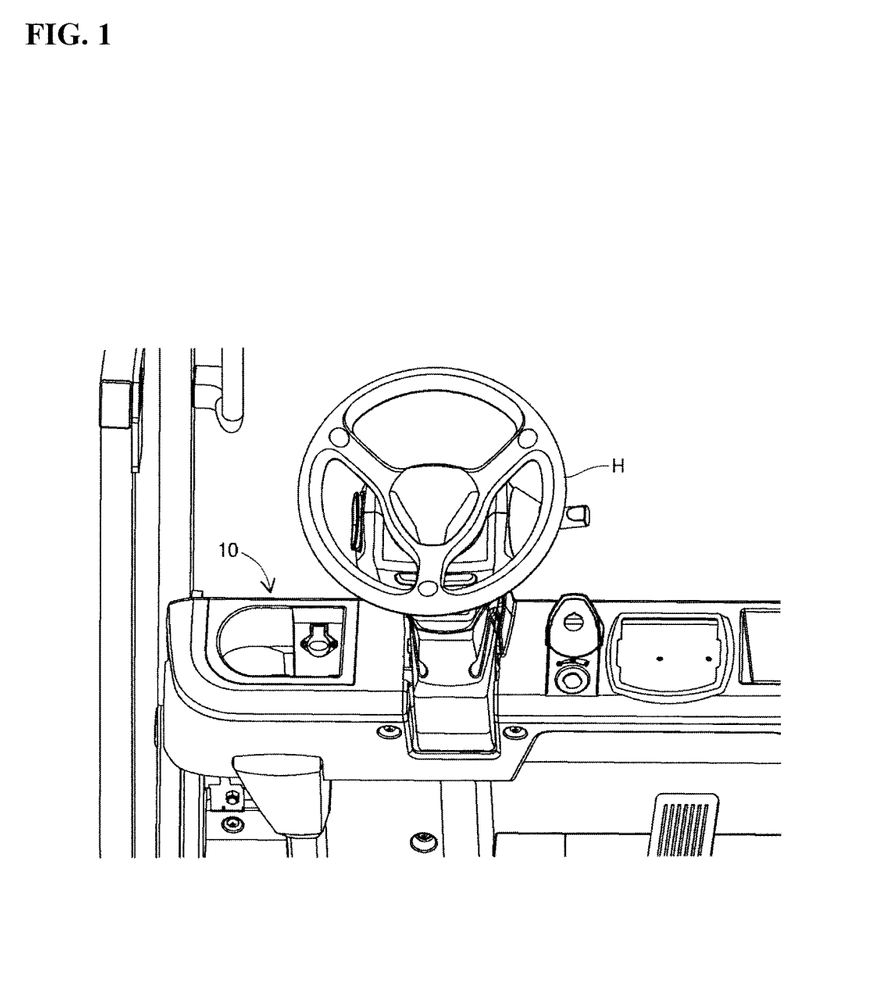
FIG. 1 is a view illustrating a state where an in-vehicle holder according to the present invention is installed.
Figure 2:
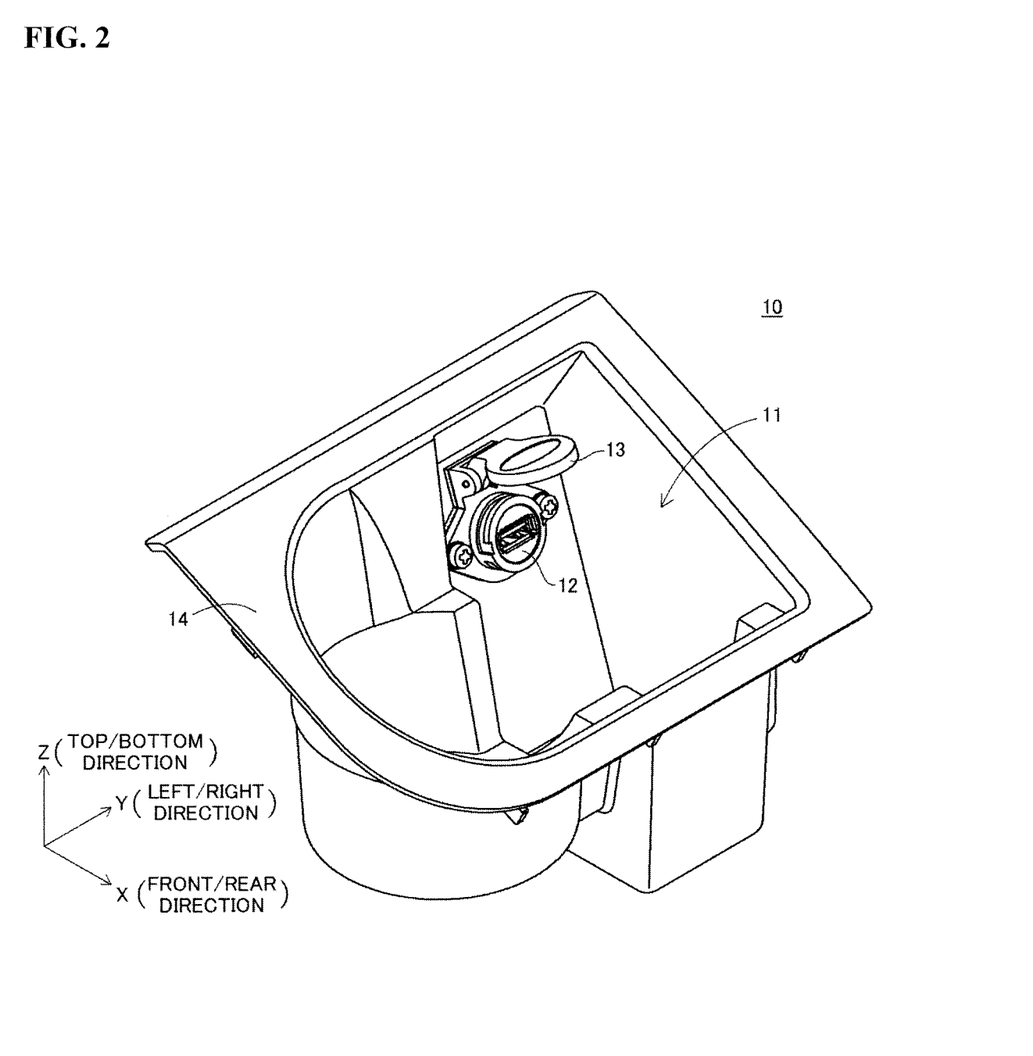
FIG. 2 is an oblique view of the in-vehicle holder according to the present invention.

The in-vehicle holder 10 according to the embodiment of the present invention is installed in a vehicle dashboard in which a steering wheel H and other components are provided, as shown in FIG. 1. The in-vehicle holder 10 can be readily accessed by a driver seated in a driver's seat simply by reaching out a hand slightly. Moreover, naturally, the driver seated in the driver's seat can also readily view the in-vehicle holder 10 (and items accommodated therein). Note that in the present embodiment, the vehicle is a forklift.

The in-vehicle holder 10 includes an accommodation space 11 with an open top, a USB port 12 with a cap 13, which is provided in the accommodation space 11, and a flange 14 enclosing the open top of the accommodation space 11, as shown in FIGS. 2 to 6. Note that in the following description, the X-, Y-, and Z-directions in FIG. 2 will be referred to as the "front/rear", "left/right", and "top/bottom" directions. Moreover, in the following description, when the holder is installed as shown in FIG. 1, the sides that are near and far from the driver's seat will be respectively referred to as the "front side" and the "back side".

The accommodation space 11 is formed by a first bottom plate 20, a first sidewall 21 extending upward from an edge of the first bottom plate 20, a second bottom plate 40 situated below the first bottom plate 20 and connected to the first bottom plate 20 via a stepped portion 30 extending in the front/rear direction, and a second sidewall 41 extending upward from an edge of the second bottom plate 40.

The first sidewall 21 and the second sidewall 41 are connected at respective upper ends to the flange 14. Moreover, the first sidewall 21 and the second sidewall 41 are connected to each other without any gap therebetween. Note that the flange 14 slants down toward the front side in order to achieve better viewability.

The first bottom plate 20 includes a circular portion corresponding to a bottom of a beverage cup. Moreover, portions of the first sidewall 21 serve as a back-side protrusion 22 and a front-side protrusion 25. The back-side protrusion 22 and the front-side protrusion 25 extend toward each other along a boundary of the first bottom plate 20 and the second bottom plate 40, i.e., along the stepped portion 30.

Figure 3:
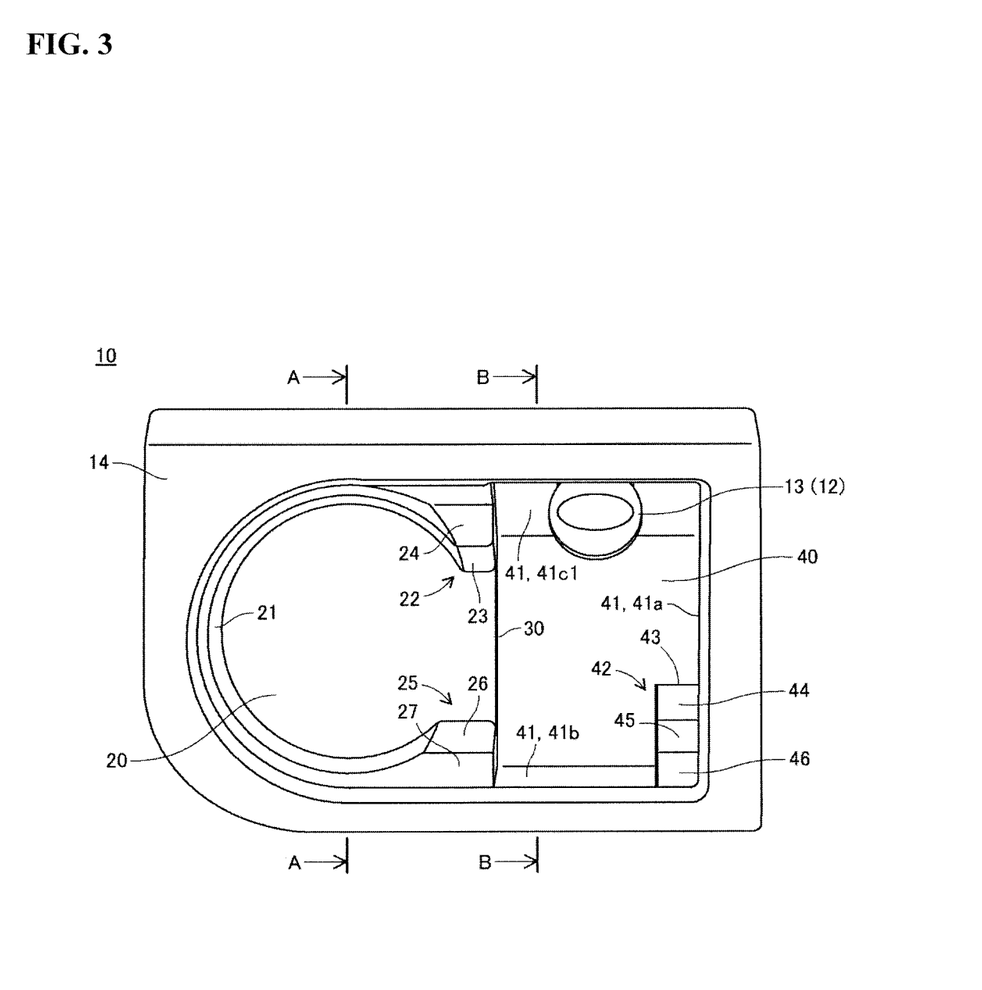
FIG. 3 is a plan view of the in-vehicle holder according to the present invention.
Figure 4:
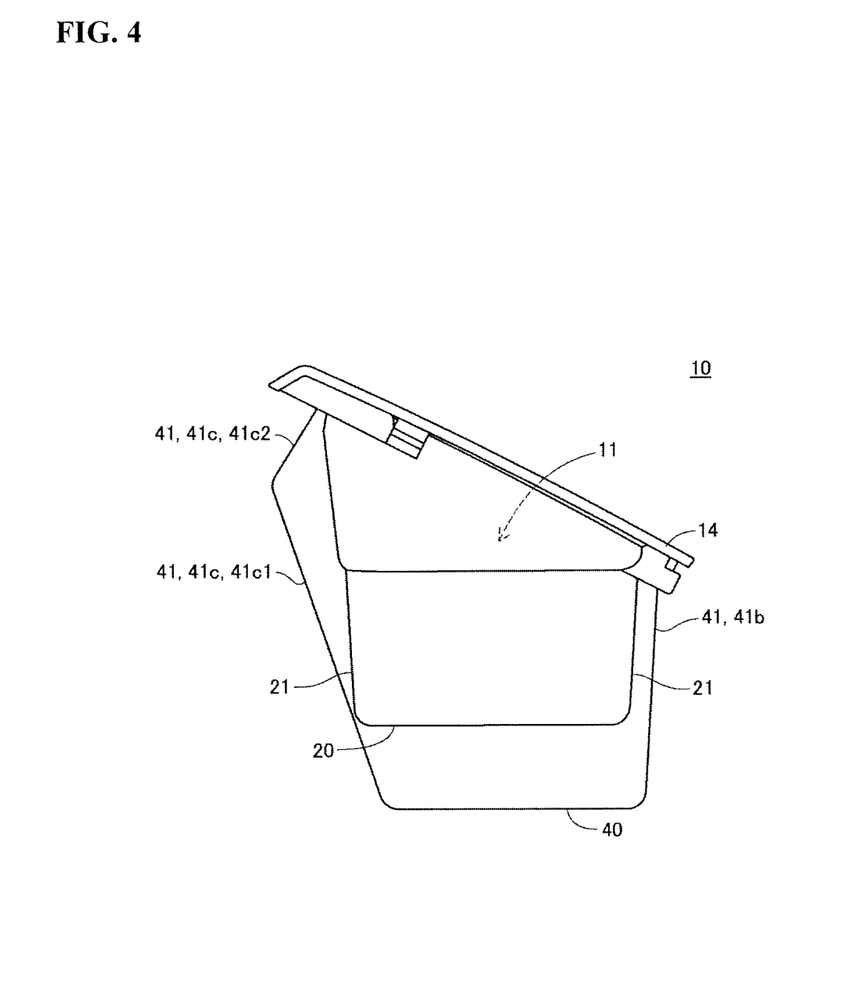
FIG. 4 is a left-side view of the in-vehicle holder according to the present invention.
Figure 5:
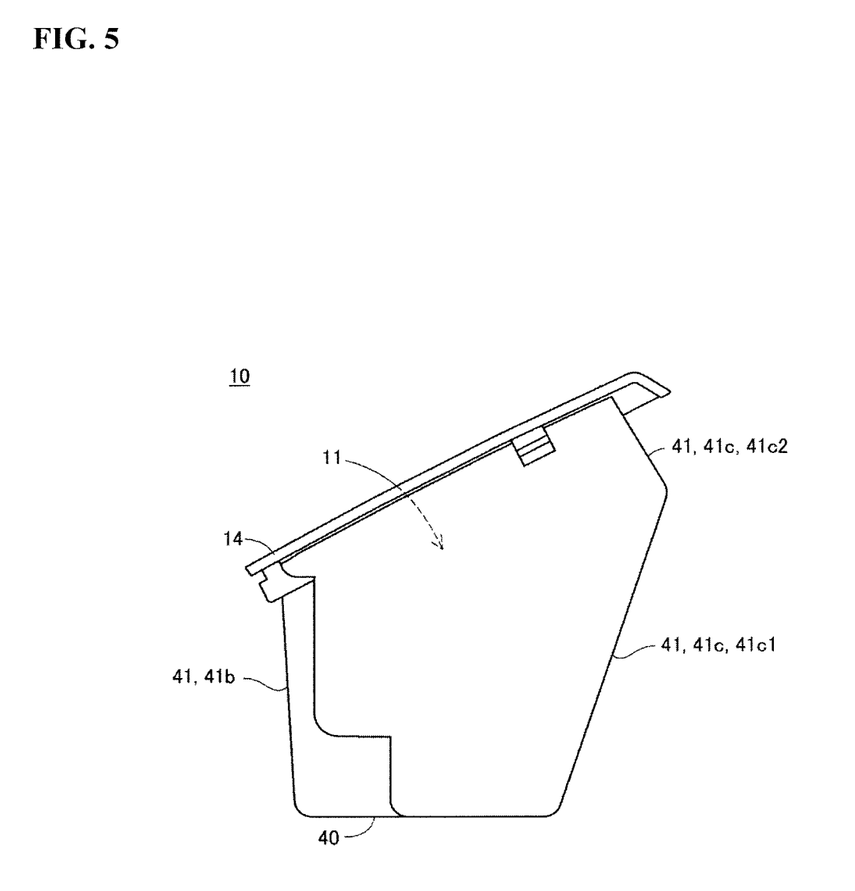
FIG. 5 is a right-side view of the in-vehicle holder according to the present invention.
Figure 6A:
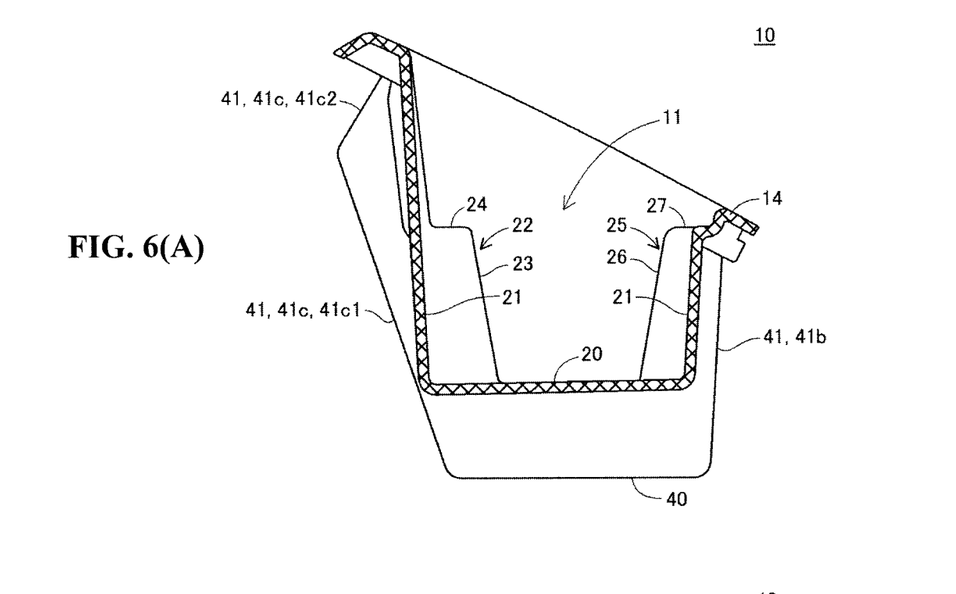
FIG. 6(A) and FIG. 6(B) provide cross-sectional views of the in-vehicle holder according to the present invention, respectively taken along lines A-A and B-B in FIG. 3.

The back-side protrusion 22 has a first surface 23 slanting toward the back side with increasing height, and a second surface 24 extending from an upper end of the first surface 23 toward the back side, as shown in FIGS. 3 and 6(A). Moreover, the front-side protrusion 25 has a first surface 26 slanting toward the front side with increasing height and serving as a first support surface, and a second surface 27 extending from an upper end of the first surface 26 toward the front side. Both the second surface 24 of the back-side protrusion 22 and the second surface 27 of the front-side protrusion 25 are parallel to the first bottom plate 20. Further, the second surface 24 of the back-side protrusion 22 and the second surface 27 of the front-side protrusion 25 are in the same plane.

A portion of the accommodation space 11 that is delimited by the first bottom plate 20 and the first sidewall 21 (including the back-side protrusion 22 and the front-side protrusion 25) functions as a cup holder.

The second bottom plate 40 has a left edge connected to the stepped portion 30, a right edge opposite to the left edge, a front-side edge, and a back-side edge opposite to the front-side edge. Moreover, the second sidewall 41 includes a second right sidewall 41a extending upward from the right edge of the second bottom plate 40, a second front-side sidewall 41b extending upward from the front-side edge of the second bottom plate 40, and a second back-side sidewall 41c extending upward from the back-side edge of the second bottom plate 40. Of these, the second back-side sidewall 41c consists of a part 41c1 slanting toward the back side with increasing height and a part 41c2 connected to an upper end of the part 41c1 and slanting toward the front side with increasing height. The part 41c2 slanting toward the front side forms approximately a right angle with the flange 14. The reason for providing the part 41c2 slanting toward the front side is to allow easy attachment/detachment of the in-vehicle holder 10 to/from the vehicle dashboard.

The USB port 12 described earlier is provided on the second back-side sidewall 41c at the part 41c1 slanting toward the back side.

Figure 6B:
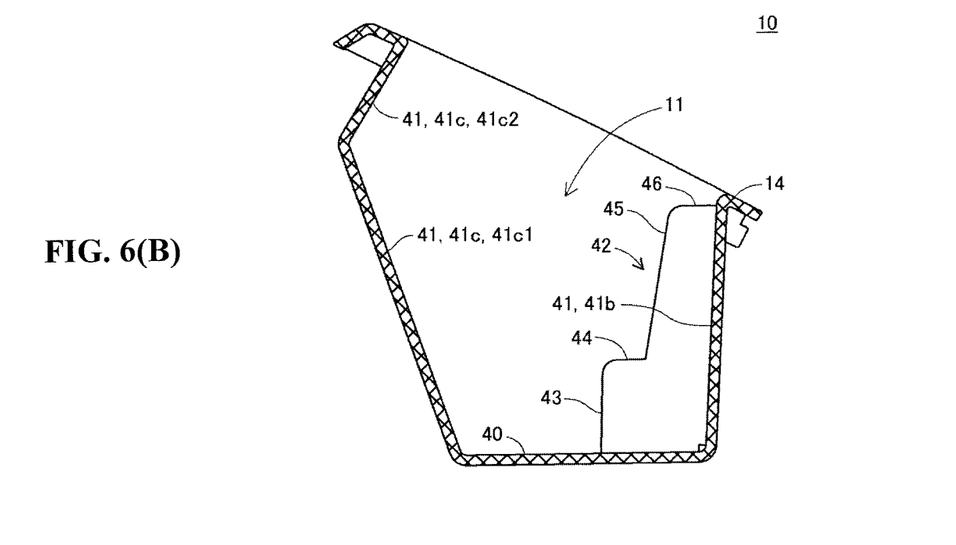

The second bottom plate 40 includes an elevated portion 42 provided in a corner where the right edge and the front-side edge intersect. The elevated portion 42 has a first surface 43 extending directly upward from the second bottom plate 40, a second surface 44 extending from an upper end of the first surface 43 toward the front side, a third surface 45 extending upward from a front-side end of the second surface 44 and serving as a second support surface, and a fourth surface 46 extending from an upper end of the third surface 45 toward the front side, as shown in FIGS. 3 and 6(B). The second surface 44 and the fourth surface 46 are parallel to the second bottom plate 40. Moreover, the second support surface 45 slants toward the front side with increasing height. The second support surface 45 is in the same plane as the first support surface 26 of the front-side protrusion 25.

The amount of elevation provided by the first surface 43 (in other words, the vertical distance between the second bottom plate 40 and the second surface 44 of the elevated portion 42) is equal to a level difference provided by the stepped portion 30. Accordingly, the first bottom plate 20 and the second surface 44 are also in the same plane.

It should be noted that in the present embodiment, the level difference provided by the stepped portion 30 is 2.5 cm, and the distance between the stepped portion 30 and the elevated portion 42 is 4 cm, but these are simply illustrative examples.

Figure 7:
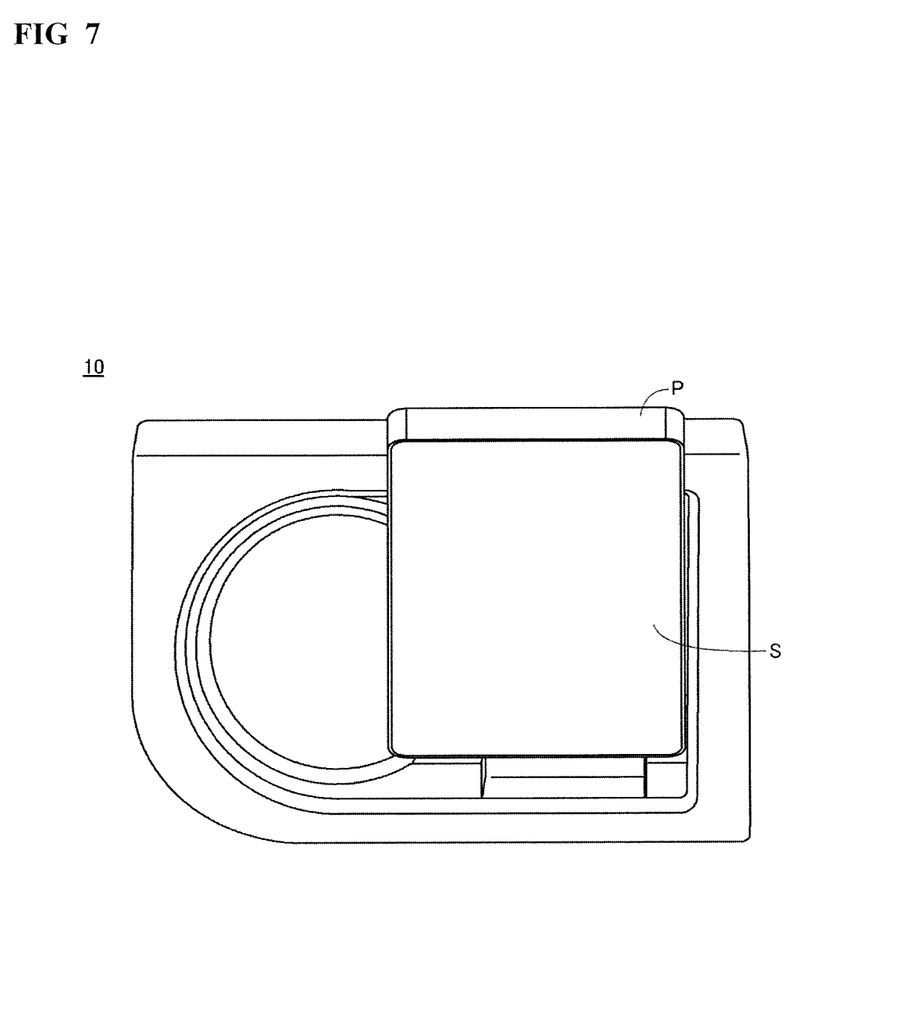
FIG. 7 is a view illustrating a position of a mobile electronic device accommodated in the in-vehicle holder according to the present invention.

The in-vehicle holder 10 according to the present embodiment can accommodate a multi-functional cell phone (smartphone) P as an example of a mobile electronic device in a position as shown in FIG. 7. In this position, the multi-functional cell phone P is supported at a lower end by the first bottom plate 20 and the second surface 44, which are in the same plane, and also by the first support surface 26 and the second support surface 45, which are in the same plane. Moreover, in this position, a front surface S (i.e., a surface with a touch panel display) of the multi-functional cell phone P faces the driver seated in the driver's seat.

By accommodating the multi-functional cell phone P in such a position, the driver can read information on the front surface S immediately when the information is displayed. Moreover, when the multi-functional cell phone P is accommodated in such a position, there is a space provided behind and below the multi-functional cell phone P, and such a space is sufficient for use as a route for a charging cable connecting the USB port 12 and the multi-functional cell phone P. Note that such a space can also be utilized for accommodating some accessories.

Figure 8:
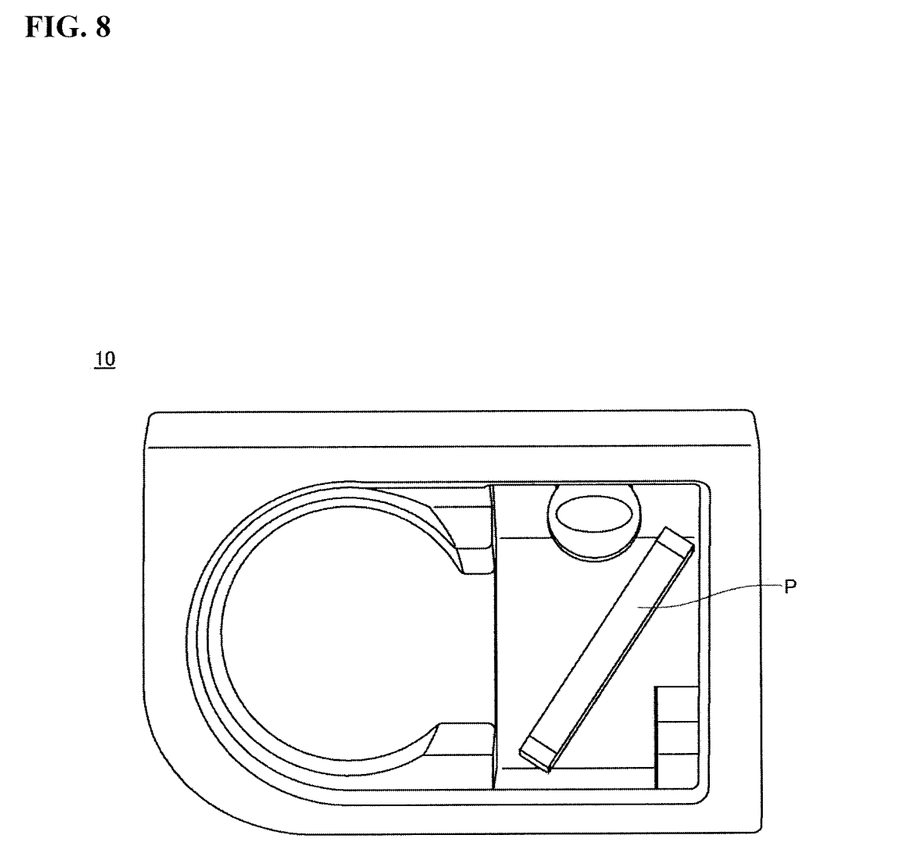
FIG. 8 is a view illustrating another position of the mobile electronic device accommodated in the in-vehicle holder according to the present invention.

Furthermore, the in-vehicle holder 10 can also accommodate the multi-functional cell phone (smartphone) P in a position as shown in FIG. 8. Accommodating the multi-functional cell phone P in such a position reduces viewability of information displayed on the front surface S of the multi-functional cell phone P, but a larger beverage cup can be accommodated.

While the in-vehicle holder 10 according to one embodiment of the present invention has been described above, the present invention is not limited to this.

For example, the USB port 12 may be another type of mobile-electronic-device connection port capable of supplying power to charge a mobile electronic device.

Furthermore, the back-side protrusion 22, the front-side protrusion 25, and the elevated portion 42 may be suitably changed in shape so long as respective functions are not impaired. Note that the back-side protrusion 22 may be omitted. However, in such a case, the capability of holding a beverage cup decreases.

Furthermore, the level difference provided by the stepped portion 30 (=the amount of elevation provided by the first surface 43) may be 2 cm. Such a 2-cm level difference still allows easy connection of the USB port 12 and the multi-functional cell phone P by a charging cable. Note that the present invention puts no upper limit to the level difference provided by the stepped portion 30.

Furthermore, the distance between the stepped portion 30 and the elevated portion 42 is preferably within the range from 3 cm to 5 cm. This range renders it possible to accommodate the multi-functional cell phone P in the position shown in FIG. 7 while maintaining a satisfactory connection with the charging cable.

Furthermore, the in-vehicle holder 10 according to the present invention may be installed in vehicles other than a forklift. For example, the in-vehicle holder 10 may be installed in a passenger vehicle.

DESCRIPTION OF THE REFERENCE CHARACTERS

10 in-vehicle holder
11 accommodation space
12 USB port (mobile-electronic-device connection port)
13 cap
14 flange
20 first bottom plate
21 first sidewall
22 back-side protrusion
23 (back side protrusion's) first surface
24 (back-side protrusion's) second surface
25 front-side protrusion
26 (front-side protrusion's) first surface (first support surface)
27 (front-side protrusion's) second surface
30 stepped portion
40 second bottom plate
41 second sidewall
41*a* second right sidewall
41*b* second front-side sidewall
41*c* second back-side sidewall
42 elevated portion
43 (elevated portion's) first surface
44 (elevated portion's) second surface
45 (elevated portion's) third surface (second support surface)
46 (elevated portion's) fourth surface

The invention claimed is:

1. An in-vehicle holder installed within reach of a driver's seat in a vehicle, comprising:
   a bottom plate;
   a sidewall extending upward from an edge of the bottom plate; and
   a mobile-electronic-device connection port provided on the sidewall, wherein,
   the bottom plate includes a first bottom plate and a second bottom plate positioned lower than the first bottom plate and connected to the first bottom plate via a stepped portion extending in a front/rear direction,
   the second bottom plate has a left edge connected to the stepped portion, a right edge opposite to the left edge, a front-side edge situated on a front side when viewed from the driver's seat after installation, and a back-side edge opposite to the front-side edge, the right edge and the front-side edge intersecting in a corner raised by an elevated portion by the same amount as a level difference provided by the stepped portion, and
   the back-side edge of the second bottom plate is connected to a part of the sidewall, the part slanting toward a back side with increasing height and being provided with the mobile-electronic-device connection port.

2. The in-vehicle holder according to claim 1, wherein the first bottom plate includes a circular portion corresponding to a bottom of a beverage cup.

3. The in-vehicle holder according to claim 1, wherein the stepped portion and the elevated portion are 3 to 5 cm apart in a left/right direction.

4. The in-vehicle holder according to claim 1, wherein the mobile-electronic-device connection port is a USB port with an openable cap.

* * * * *